United States Patent [19]
Veal

[11] 4,151,396
[45] Apr. 24, 1979

[54] WELDING CONTROL SYSTEM

[76] Inventor: Leo D. Veal, 3759 Cottage Hill Rd., Mobile, Ala. 36609

[21] Appl. No.: 840,587

[22] Filed: Oct. 11, 1977

[51] Int. Cl.² ............................................. B23K 9/10
[52] U.S. Cl. ................................. 219/132; 219/130.31
[58] Field of Search .................. 219/132, 136, 130.21, 219/130.31, 130.4

[56] References Cited

U.S. PATENT DOCUMENTS

| | | | |
|---|---|---|---|
| 1,708,072 | 4/1929 | Alexander | 219/130.31 |
| 2,249,457 | 7/1941 | Catlett et al. | 219/130.31 |
| 2,964,681 | 12/1960 | Anderson | 219/132 |
| 3,863,046 | 1/1975 | Morales | 219/132 |

*Primary Examiner*—Bruce A. Reynolds
*Assistant Examiner*—Clifford C. Shaw
*Attorney, Agent, or Firm*—C. A. Phillips

[57] ABSTRACT

A switching system that provides means for a welder to make precise point arc strikes and to prevent a welder from receiving an electrical shock while he is inserting a welding electrode into the electrode holder. The system includes an automatically controlled switch which prevents uncontrolled open circuit voltage from existing at the electrode holder when the welding arc is interrupted. Additionally, the system includes a manually operated switch for reestablishing full potential on the electrode holder to facilitate striking an arc, with the flow of current to the welding arc being continuous as long as the arc is maintained after the manual switch is released.

7 Claims, 1 Drawing Figure

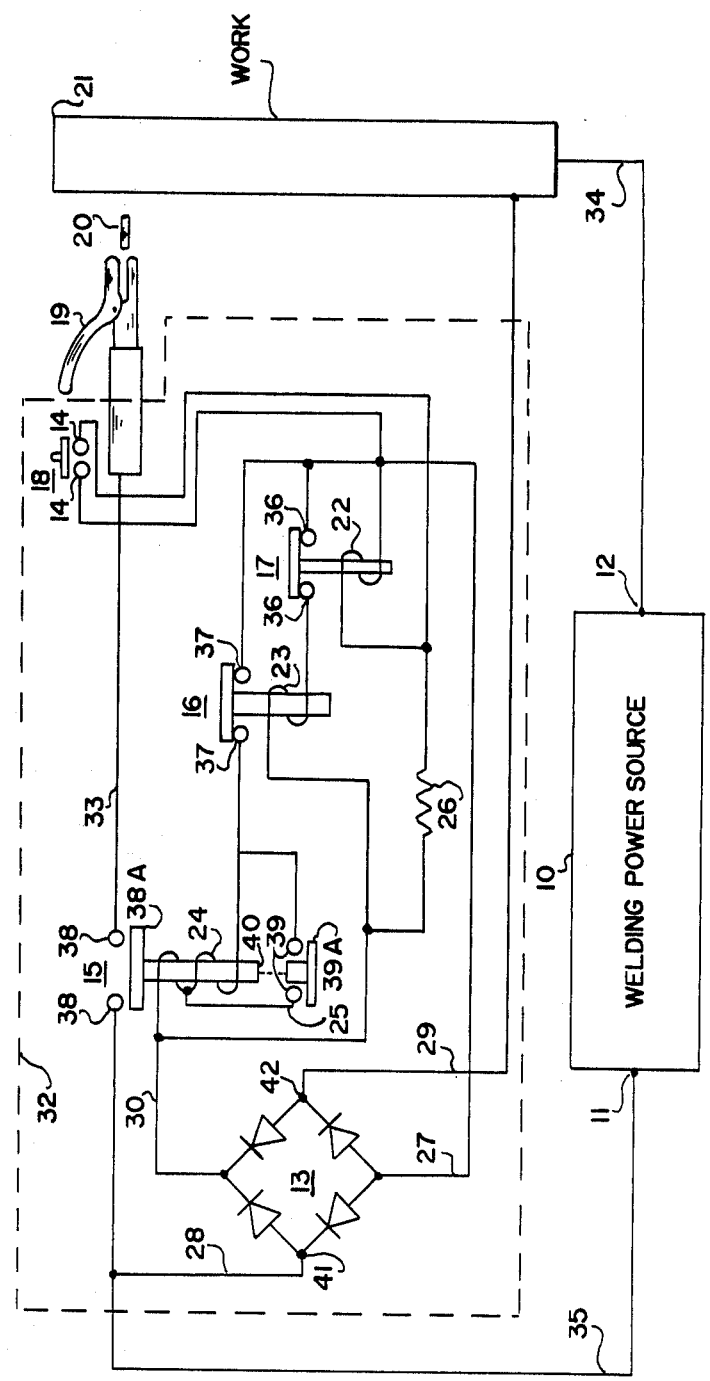

WELDING CONTROL SYSTEM

BACKGROUND OF THE INVENTION

1. Field of the Invention

This invention relates to the art of electric welding, and particularly to a control system for automatically isolating a welding electrode holder from the welding power source during a no-load, high voltage condition.

2. General Description of the Prior Art

Electric arc welding has been practiced for about 50 years. It requires a relatively high powered current source, one capable of providing ample current to melt welding electrodes that range from 1/16 to 5/16 inch in diameter at an operating voltage of 20 to 40 volts, AC or DC. It is also necessary that the power source provide an open circuit (no load) voltage significantly higher than the load voltage, typically 70 to 100 volts in order to readily strike an arc and provide the short circuit recovery drive necessary for stable welding.

The general arrangement of equipment for manual electric arc welding in common use is a welding power source that has two terminals for the welding circuit, with one of the terminals connected via a power cable to the work piece to be welded, and the other terminal connected via a flexible power cable to an electrode holder. The electrode holder is, in essence, an insulated metal clamp specially designed for holding a welding electrode. The clamp portion is supported by an insulated handle which is gripped by the welder. A welding electrode is a round metal rod that may be from 1/16 to 5/16 inch in diameter and range from 9 to 18 inches long. Approximately one inch of the electrode at one end is bare for good electrical contact when it is inserted into the jaws of the electrode holder. The remainder of the electrode is coated with various chemical formulations. The coatings usually consist of fluxing agents, arc stabilizers, varying amounts of metal powders, and proprietary substances. The coatings exhibit little, if any, insulating effect; consequently, when a welder grips a welding electrode and places it into the jaws of the electrode holder, he does so at considerable risk of electrical shock, for it is at this time that the open circuit (no load) voltage exists at the electrode holder.

To commence welding, a welder places an electrode into an electrode holder, places his welding helmet into position over his face and flicks the electrode against the work piece to establish an arc, and then proceeds to move the electrode along just a fraction of an inch above the work piece to effect welding. As welding progresses, the electrode is gradually consumed in two or three minutes. Then, the stub of the old electrode must be removed and a new electrode inserted into the electrode holder which has on it a live circuit of 70 to 100 volts and the potential of an extremely high current. Since the welding electrode is consumed in less than three minutes, the average production welder will change electrodes more than 100 times per day. Each change of electrode necessitates numerous hand contacts, typically through a leather glove, which, when dry, is a poor insulator. However, the heat of the welding arc and the molten metals present in all electric welding will generally cause a welder's gloves to be damp with perspiration; consequently, the little insulating effect of the leather gloves is totally lost.

Typically, in the construction of ships, bridges, buildings, and in most heavy steel plate fabricating facilities, it is common practice for a welder to be standing, sitting, or kneeling on, or in some other way making bodily contact with the large work pieces involved. It is almost impossible for a welder to insulate himself from the work piece; and when he becomes damp from perspiration, the welder's conductance is increased, thus increasing his potential for electrical shock when he is changing electrodes. As a result, welders are frequently shocked. It is a well documented fact that many welders have been fatally shocked, and others have suffered severe and disabling non-fatal shocks.

This problem has existed from the beginning of electric welding, and it would seem that a practical solution would have been found before now. However, judging by the expanding volume of welding being done without safeguards against shock, it must be assumed that a practical solution has not previously been provided.

In some welding shop operations where a welder is operating in close proximity to a welding power source (15 to 20 feet), he could turn off the power before changing electrodes, making it a safe procedure. Of course, he would them have to return to the power source to turn the power on again before he could proceed to weld. It is obvious that this would more than double the welding time of any job, and, in general practice, it is very seldom done. In the fabrication of large structures such as buildings, bridges, and ships where there are long welding lines (often over 200 feet) running between the power source and a welder, it would be completely impractical and cost prohibitive for a welder to go back and forth to turn the welding power source off and on when changing electrodes.

This is not to imply that nothing has been done to control the problem of shock to a welder. There have been a number of systems designed to modify the welding power source, but their deficiencies are such as to prevent their general acceptance. One such system, perhaps the most popular one, is in the form of a specially designed power source having a control circuit coupled to both the primary and secondary windings of a welding current transformer. An open welding current circuit (caused by breaking an arc) results in contacts in the primary of the welding current transformer being opened and a control voltage of approximately 30 volts to be placed on the secondary winding of the transformer and thus on the welding current cables. A welder now has approximately a 30-volt potential on the electrode to contend with rather than a 70- to 100-volt potential while changing electrodes. Of course, even this smaller potential can cause a shock. Aside from this, the basic problem with this system is that to reestablish the higher open circuit voltage on the welding electrode, it is necessary to ground the welding electrode for a brief instant to complete a control circuit which will operate a primary winding contactor to close it and reapply full power. Typically, power is reapplied after a delay of one to two seconds after a successful grounding of the welding electrode to effect switching.

A further problem with this system, in addition to the fact that there remains a 30-volt potential on the electrode after an arc is broken, is that a welder cannot readily tell when he has succeeded in accomplishing a good ground contact to effect the desired switching, and often several efforts are required to accomplish this. This follows since there may be rust, paint, or scale on the work piece surface, and a good contact is often difficult. As a result of the uncertainty, welding power may come on when unexpected, causing the electrode to stick, or a welder may strike an arc where he does not intend to weld. Further, by virtue of this circuit arrangement, any accidental contact between the electrode and the work piece will cause a welding potential to be applied to the electrode, making it necessary for a welder to always insulate the electrode from the work piece any time that the electrode holder is laid down.

The net result is that while equipment operating as described in the preceding paragraph will provide a measure of protection for a welder, it, and similar equipment, have deficiencies which have prevented widespread use; and, unfortunately, today most welding is done without a welder having any control over the applicaton of power to his welding circuit. Thus, thousands of welders operate in a manner which makes them quite vulnerable to severe shock.

Another problem which arises from this lack of control by a welder over the presence of a welding potential and current is that of accurately striking an arc with the end of an electrode which is sticking out an additional 9 to 18 inches from the electrode holder held in his hand. Since an arc is struck with a welder's hood down over his face for viewing welding through a very dark glass, he does not see where an arc is struck until after it is established. Accordingly, many arc strikes are considerably off target, and a great deal of work is ruined or requires costly repairs because of this.

A further problem is the added shock hazard inherent in alternating current welding systems, which are otherwise less costly to own and operate. It is widely accepted that if the shock hazard from AC electric welding could be reduced, this mode of welding would be significantly expanded.

In view of the foregoing problems, and as a welder and a designer of welding systems for many years, the inventor has determined a control system which does eliminate shock hazards for welders in an absolute and essentially foolproof manner. The control system also provides means for eliminating off-target arc strikes, thus saving industry thousands of dollars in valuable material and rework labor; and all of these benefits are obtained without the requirement for any remote switching function extending between a welder and the power source, and without any modifications to the power source, which may be either AC or DC.

SUMMARY OF THE INVENTION

In accordance with this invention, a control system is placed in circuit with a welding cable supplying power to an electrode holder. The control system includes means for sensing the state which exists when an arc is broken, and therefrom an electrically controlled switch in circuit with the power cable and electrode holder is opened. A manually operated momentary switch is mounted on the handle of the electrode holder and circuit means are connected to it, which, when operated, will close the electrically controlled switch and thus provide full open circuit voltage on the electrode, enabling an arc to be struck. Conversely, when it becomes necessary to change an electrode, a welder simply breaks his arc, automatically causing the control system to operate to remove the otherwise existing open circuit voltage of the electrode holder. He would then replace the electrode, positioning the new electrode just over the spot where it is desired to begin welding and operate the momentary switch on the handle of the electrode holder, strike an arc, and resume welding. Actually, a welder can initially rest the electrode against the work piece at the exact point where he desires to weld. Then, with the electrode thus accurately positioned, he may lower his hood and move the electrode just off the work piece, operate the hand switch, strike an arc, and resume welding. The flow of current to the electrode will remain continuous until the arc is terminated, though a welder releases the momentary switch on the handle of the electrode holder as quickly as the arc is established.

BRIEF DESCRIPTION OF THE DRAWING

The drawing is a schematic diagram of an overall welding system embodying the invention.

DETAILED DESCRIPTION OF THE DRAWING

The drawing illustrates the context and interconnection of this invention in a welding system. The object of the invention which is particularly unique is set forth in the drawing within the dotted outlined area which is indicated by the reference numeral 32, which will hereinafter be referred to as control device 32. The balance of the diagram is only representative of the common arrangement of an arc welding circuit and depicts the simplicity of an embodiment of this invention.

The welding power source, which is indicated by rectangular block 10, is conventional and may be either engien driven or electrically powered, providing an no-load arc striking potential of 70 to 100 volts, and providing a load voltage of 20 to 40 volts, AC or DC. A work piece 21 that is to be welded is connected by cable 34 to terminal 12. Welding electrode 20 is held by electrode holder 19, which is attached to extra-flexible welding whip cable 33 (normally 10 to 15 feet in length). Whip cable 33 is attached to one of contacts 38 of normally closed power relay 15 of control device 32, and power to whip cable 33 and electrode holder 19 is supplied from terminal 11 of power source 10 via cable 35 to the other of contacts 38. Bridge rectifier 13, which supplies power to control device 32, has input terminal 41 connected to the power circuit of electrode holder 19 via conductor 28, with input terminal 42 connected to work piece 21 via conductor 29. Thus, a DC control voltage appears across bridge rectifier output conductors 27 and 30 of a constant polarity, regardless of whether the voltage on input conductors 28 and 29 is AC or DC, and, if DC, regardless of the polarity of cables 34 and 35.

To more clearly show electrode holder 19 electrically dead and isolated from welding power source 10, the circuits of control device 32 are shown in the active high potential no-load condition, depicting electrode 20 as a shot stub, and assumes the welding arc has just been terminated. When the welding arc is terminated, the open circuit voltage of welding power source 10 is seen instantly across terminals 11 and 12, thence across cables 34 and 35, and thence across bridge rectifier 13 via conductors 28 and 29, then thence through resistor 26 and across coil 22 of normally open relay 17, which will cause contacts 36 of relay 17 to close, thus completing the circuit for coil 23 for normally open relay 16, which will cause contacts 37 of relay 16 to close, thus completing circuit feeding coil 24 of power relay 15. Power relay 15 has a first and second set of contacts. The first set of contacts 38 are high current contacts, and the second set of contacts 39 are low current contacts. At the time circuit feeding coil 24 of power relay 15 was completed, the second set of contacts 39 of power relay 15 were in their normally closed condition, effectively shorting out two-thirds of the windings of coil 24 by conductor 25 which attaches to coil 24 at a tap point which approximates one-third of the total windings of coil 24. With two-thirds of coil 24 shorted out, the remaining one-third of coil 24 will have a high current density condition imposed upon it which will cause armature 40 of power relay 15 to accelerate toward the open position at a higher than normal rate, thus providing a quite rapid opening (by contactor 38a mounted on armature 40) of high current contacts 38 of power relay 15. When armature 40 of power relay 15 has traveled approximately 75 percent of the total travel toward the full open position, low power contacts 39 of power relay 15 will be mechanically opened (by contactor 39a mounted on armature 40), thus placing the full windings of coil 24 across the circuit of bridge rectifier 13. The circuits of control device 32 will now be as illustrated.

To commence welding, a welder would manually close the normally open contacts 14 of switch 18 which will short out coil 22 of relay 17, thus causing contacts 36 of relay 17 to go to their normally open condition. Resistor 26 prevents a complete short circuit load on rectifier 13 when switch 18 is closed. Coil 22 of relay 16, being in series with contacts 36 of relay 17, will now have an incomplete circuit means so contacts 37 of relay 16 will move to their normally open position, thus the circuit across coil 24 of power relay 15 will be incomplete, thus causing first and second contacts 38 and 39 to go to their normally closed condition and establish full open circuit voltage arc striking potential at electrode holder 19. A welder would now strike the arc, and as quickly as the arc is stabilized, manually controlled momentary switch 18 may be released to return contacts 14 to their normally open condition. This drops the voltage input and output of rectifier 13 to a voltage in the range of 20 to 40 volts, and coil 22 of relay 17 is adapted to require approximately 50 volts to effect closing, and thus relay 17 and thereby relay 16 remain open, enabling power contacts 38 of relay 15 to remain closed and an arc to continue after switch 18 is opened. This state will continue until a welder breaks his arc, and when this occurs, the resulting high open circuit voltage will be applied through rectifier 13 which will be in excess of 50 volts, typically 70 to 100 volts. This will effect the closing of relay 17 and thereby relay 16, and as described above, contacts 38 will be opened removing potential from electrode holder 19 and enabling the electrode holder to be freely and safely handled to remove and replace electrode 20.

What is claimed is:

1. A welding control system adapted to be located remote from a welding current source and to be solely powered from a pair, first and second, of power welding cables which directly connect to a welding electrode and work piece providing a welding current and comprising:

an electrode holding assembly including an electrode clamp, insulated handle, and manually operated momentary switch mounted on said handle;

an electrically controlled, normally closed switching means for switching power between first and second terminals, and responsive to less than a selected value of signal input for maintaining a closed condition between said first and second terminals, and responsive to a signal input greater than said selected value for switching to an open condition between said first and second terminals;

means for connecting said first welding power cable to said first terminal and for connecting a relatively short power cable between said second terminal and said electrode clamp of said electrode holder;

first signal means coupled to said first welding power cable and to a work piece, connectible to said second welding power cable, and including means for providing a said signal input to said switching means, said signal input being normally, with welding current present, less than said selected value, and with cables energized with a no-load voltage, said signal input being greater than said selected value; and second signal means including said momentary switch and in circuit with said first signal means for momentarily providing said less than selected value signal to said switching means upon the operation of said momentary switch;

whereby, upon the occurrence of a no-load voltage on and between said first and second welding power cables, all power is removed from said electrode clamp and, selectively, by the operation of said momentary switching, welding power is restored between said electrode clamp and said second power cable.

2. A welding control system as set forth in claim 1 wherein said switching means comprises a power relay having a coil and a pair of normally closed contacts comprising said first and second terminals and means responsive to a signal from said first signal means for providing an operating signal to said coil.

3. A welding control system as set forth in claim 2 wherein said switching means includes a second relay having normally open contacts in series with said coil of said power relay, and said second relay includes a coil and switchable high-low impedance means in circuit with said momentary switch for providing a high impedance state in series with said last-named coil responsive to the operation of said momentary switch.

4. A welding control system as set forth in claim 3 wherein said switchable high-low impedance means further includes means responsive to less than a said discrete value of signal from said first signal means for providing a said high impedance state in series with said last-named coil, and responsive to a greater than a said discrete value of signal for providing a low impedance state in series with said last-named coil, whereby the operation of said momentary switch effects an opening of said second relay, a closing of said power relay, and produces a high, open circuit, voltage across said power welding cables, and then by the striking of an arc, there is produced said lower than a discrete value signal, and it enables the open state of said second relay and closed state of said power relay to be maintained to enable welding to continue after the operation of said momentary switch.

5. A welding control system as set forth in claim 4 wherein said first signal means comprises a bridge rectifier powered from said first and second welding cables and supplying power to said switching means.

6. A welding control system as set forth in claim 4 wherein:

said switchable high-low impedance means comprises a third relay having a coil powered from said first signal means;

said momentary switch is a normally open switch connected in circuit across said last-named coil; and said third relay has a pair of normally open contacts in series with said coil of said second relay.

7. A welding control system as set forth in claim 6 wherein said power relay includes:
a second set of normally closed contacts;
armature means magnetically coupled to said coil of said power relay, and including means for progressively openings, with movement of said armature means, said first-named normally closed contacts, and then said second set of normally closed contacts; and
said coil of said power relay having an electrical tap intermediate its ends and forming thereby first and second windings, and wherein said second set of contacts are connected across one of said windings, whereby an initial contact opening movement of said armature is effected by the application of applied voltage through only one of said windings, and thereafter with the opening of the second set of contacts, the voltage applied to said coil is connected in series across both of said windings to thereby effect a decrease in power consumed while operating in a holding mode.

* * * * *